(12) United States Patent
Muthukrishnan et al.

(10) Patent No.: US 11,741,022 B2
(45) Date of Patent: *Aug. 29, 2023

(54) FINE GRAINED MEMORY AND HEAP MANAGEMENT FOR SHARABLE ENTITIES ACROSS COORDINATING PARTICIPANTS IN DATABASE ENVIRONMENT

(71) Applicant: Oracle International Corporation, Redwood Shores, CA (US)

(72) Inventors: Nagarajan Muthukrishnan, Foster City, CA (US); Ravi Shankar Thammaiah, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/204,708

(22) Filed: Mar. 17, 2021

(65) Prior Publication Data

US 2021/0200690 A1 Jul. 1, 2021

Related U.S. Application Data

(63) Continuation of application No. 16/001,335, filed on Jun. 6, 2018, now Pat. No. 11,030,123.

(51) Int. Cl.
*G06F 12/14* (2006.01)
*G06F 9/48* (2006.01)
(Continued)

(52) U.S. Cl.
CPC ............ *G06F 12/1458* (2013.01); *G06F 9/48* (2013.01); *G06F 9/5016* (2013.01); *G06F 12/1408* (2013.01); *H04L 63/104* (2013.01)

(58) Field of Classification Search
CPC ...... G06F 12/1458; G06F 9/48; G06F 9/5016; G06F 12/1408; H04L 63/104
(Continued)

(56) References Cited

U.S. PATENT DOCUMENTS 6,952,722 B1 10/2005 Podila et al.
7,996,841 B2 8/2011 Smith et al.
(Continued)

OTHER PUBLICATIONS

Chapter 3. Sharing Memory Between Processes, Part II. Interprocess Communication, http://csweb.cs.wfu.edu, retrieved on Mar. 19, 2019, 20 pages.
(Continued)

*Primary Examiner* — Hosain T Alam
*Assistant Examiner* — Nicholas E Allen
(74) *Attorney, Agent, or Firm* — Invoke (57) ABSTRACT

Many computer applications comprise multiple threads of executions. Some client application requests are fulfilled by multiple cooperating processes. Techniques are disclosed for creating and managing memory namespaces that may be shared among a group of cooperating processes in which the memory namespaces are not accessible to processes outside of the group. The processes sharing the memory each have a handle that references the namespace. A process having the handle may invite another process to share the memory by providing the handle. A process sharing the private memory may change the private memory or the processes sharing the private memory according to a set of access rights assigned to the process. The private shared memory may be further protected from non-sharing processes by tagging memory segments allocated to the shared memory with protection key and/or an encryption key used to encrypt/decrypt data stored in the memory segments.

20 Claims, 5 Drawing Sheets

(51) Int. Cl.
*G06F 9/50* (2006.01)
*H04L 9/40* (2022.01)

(58) Field of Classification Search
USPC .......................................................... 707/802
See application file for complete search history.

(56) References Cited

U.S. PATENT DOCUMENTS

| | | | |
|---|---|---|---|
| 8,286,188 | B1 | 10/2012 | Brief |
| 8,645,967 | B2 | 2/2014 | Ludwig et al. |
| 8,954,697 | B2 | 2/2015 | Horman et al. |
| 9,251,114 | B1 | 2/2016 | Ancin et al. |
| 9,553,951 | B1 | 1/2017 | Nguyen et al. |
| 10,560,524 | B2 | 2/2020 | Rodgers |
| 11,030,123 | B2 * | 6/2021 | Muthukrishnan ..... G06F 12/023 |
| 2009/0006502 | A1 | 1/2009 | Leung et al. |
| 2014/0101538 | A1 | 4/2014 | Style |
| 2014/0108474 | A1 | 4/2014 | David et al. |
| 2014/0195564 | A1 | 7/2014 | Talagala et al. |
| 2014/0215192 | A1 | 7/2014 | Bai et al. |
| 2014/0304299 | A1 | 10/2014 | Yan et al. |
| 2015/0278243 | A1 | 10/2015 | Vincent et al. |
| 2015/0278397 | A1 | 10/2015 | Hendrickson et al. |
| 2016/0072889 | A1 * | 3/2016 | Jung ...................... H04L 61/457 709/219 |
| 2016/0103870 | A1 | 4/2016 | Patiejunas et al. |
| 2017/0329957 | A1 * | 11/2017 | Vepa ..................... G06F 21/445 |
| 2017/0331832 | A1 | 11/2017 | Lander et al. |

OTHER PUBLICATIONS

Creating Named Shared Memory (Windows), Mar. 2, 2018.
Docker in Action: The Shared Memory Namespace, Feb. 27, 2018.
Sharing memory between processes, www.boost.org, retrieved on Mar. 19, 2019, 14 pages.

* cited by examiner

FINE GRAINED MEMORY AND HEAP MANAGEMENT FOR SHARABLE ENTITIES ACROSS COORDINATING PARTICIPANTS IN DATABASE ENVIRONMENT

INCORPORATION BY REFERENCE; DISCLAIMER

The following application is hereby incorporated by reference: application Ser. No. 16/001,335 filed on Jun. 6, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to memory management in a computing environment. Specifically, the disclosure is directed to providing memory that is shared privately among cooperating processes.

BACKGROUND

Many computer applications comprise multiple threads of executions. Client requests may be fulfilled by multiple cooperating processes. A database environment is an example of a computing environment in which such parallel processes need to share information with each other. Data stored in one process' private address space is not accessible to other processes, and thus, cannot be used for sharing data with other processes. Similarly, data stored in one thread's private memory is not accessible to other threads in the process. For example, a database server comprises a multitude of threads of executions including processes that receive and execute queries on behalf of clients. A single client query, when processed by the database server, may be executed by at least two cooperating processes. For example, a query coordinator process may identify computation that may be performed in parallel, and distinct worker processes may be assigned to perform parallel computation. When completed, the query coordinator may further process results from the worker processes to return a final response to the client. Thus, the query coordinator process and cooperating worker processes may share data such as sub-query results pertaining to a client query.

Multiple threads within a process may be used to perform client query computations in parallel. All threads within a process share access to the process memory.

Cooperating processes in a computing environment may share memory with operating system support. With operating system (OS) supported shared memory, such as system V shared memory, the OS provides interfaces to create and attach to the shared memory segments. For example, a database server may allocate shared memory in a shared memory in a global area, and any process participating in the database environment may have equal access to all data stored in these shared memory segments. Accordingly, data stored in the shared global area may be accessed by processes unrelated to a particular set of cooperating processes.

In the context of virtual databases (multi-tenant databases), multiple organizations may pay a subscription to use a database manager as a service to reduce the cost of acquisition, provisioning, and management of database servers. The service may be implemented by having the multiple subscribers share a physical database while presenting a virtual private database to each subscriber. In addition, a particular process may be processing queries on behalf of multiple clients concurrently, and individual threads running in the particular process's address space may be performing computations on behalf of different clients.

Protecting the privacy of one subscriber's data from other subscribers is of paramount importance. The shared database server may use a pool of processes or threads that perform computation on behalf of any of the subscribers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include creating, securing, and managing memory namespaces that may be shared among a group of cooperating processes. The shared memory namespaces are accessible only to cooperating processes that are members of a respective group, not to other processes external to the group. Access rights for using and managing a shared namespace may be granted and enforced using a handle that references a descriptor for the shared namespace. Managing access rights may include managing protection keys for protecting access to memory and encryption keys used by a library or the hardware for encrypting/decrypting data written to/read from memory in the shared namespace.

In a database environment, multiple processes may cooperate to execute a single query. The query coordinator for a parallel query may request a memory namespace to be shared among the processes working together to execute the query, but inaccessible to other processes in the database system. When query processing completes, the memory namespace may be released and deallocated.

Advantageously, some embodiments improve security without degrading performance. As an example, cooperating processes can share memory privately without the overhead typically associated with message passing or other forms of inter-process communication.

One or more embodiments described in this Specification and/or recited in the claims may not be included in this General Overview section.

2. Shared Namespace Architecture

A namespace as used herein refers to one or more managed memory segments. A memory segment as used herein is a contiguous chunk of memory allocated by the operating system (OS). A namespace may comprises any kind of memory segments such as System V segments, remote segments, and custom segments.

Figure 1A:
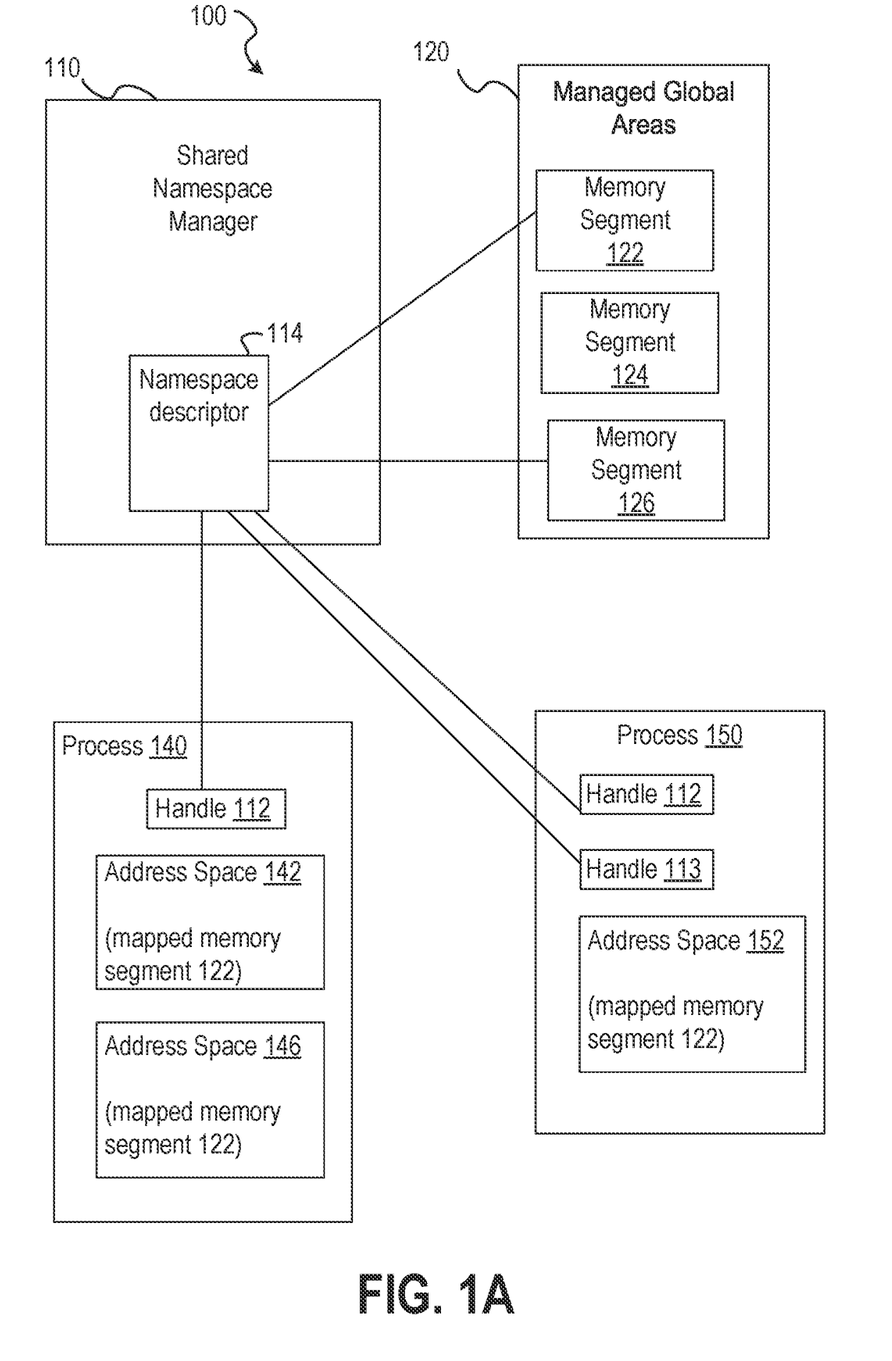
FIG. 1A is a block diagram that illustrates components of the system, in accordance with one or more embodiments.

FIG. 1A is a block diagram that illustrates components of the system, in accordance with one or more embodiments. System 100 comprises a Shared Namespace Manager 110, Managed Global Areas 120, Process 140 and Process 150. The diagram illustrates the relationships among these system components.

Shared Namespace Manager 110 manages namespaces that may be shared among cooperating processes. In an embodiment, the processes each have a private virtual address space, and memory allocated from the process private heap is not shareable with other processes. The Shared Namespace Manager 110 receives requests for a namespace that is shareable privately with other processes. The shared namespace manager 110 (hereinafter "SNM") creates a shareable namespace including creating and managing a Namespace descriptor 114. The SNM also provides the requesting process with a handle that references the namespace descriptor 114. A process, having received a handle, may further request that the SNM authorize a set of one or more identified processes to share the namespace. The SNM may receive a request from a process to attach to the namespace, which the SNM grants if the requesting process is authorized. The SNM also allocates and manages memory segments added to the namespace. In addition to allocating the memory segments, managing the shared namespace includes increasing the size of the namespace by adding additional memory segments, and releasing resources when no processes are attached to the namespace.

In an embodiment, the SNM 110 may be implemented as a library that is callable by code executing within a process through an API. The SNM 110 library code running in the context of one process may communicate with the SNM 110 library code in other processes through shared memory, such as operating system-supported shared memory, to manage shared namespaces. In an embodiment, only a client portion of the SNM 110 code may be linked into a process, the client portion of SNM code having access to the execution state of the process. The client portion of the SNM code may interact with a separate server SNM 110 process through an API.

Namespace descriptor 114 is a data structure that is identified by a handle. The namespace descriptor stores information about a corresponding namespace including identifiers of memory segments allocated to the namespace, one or more access keys, such as protection keys and/or encryption keys associated with respective memory segments, processes that have attached to the namespace, and access rights granted to each attached process. In an embodiment, the namespace descriptor 114 may be stored in shared memory or the private process heap of the SNM. In any case, the address of the namespace descriptor is not shared with other processes. Instead, a handle that references the namespace descriptor is created and shared with other processes. Thus, the namespace descriptor itself can only be accessed by the SNM.

Figure 1B:
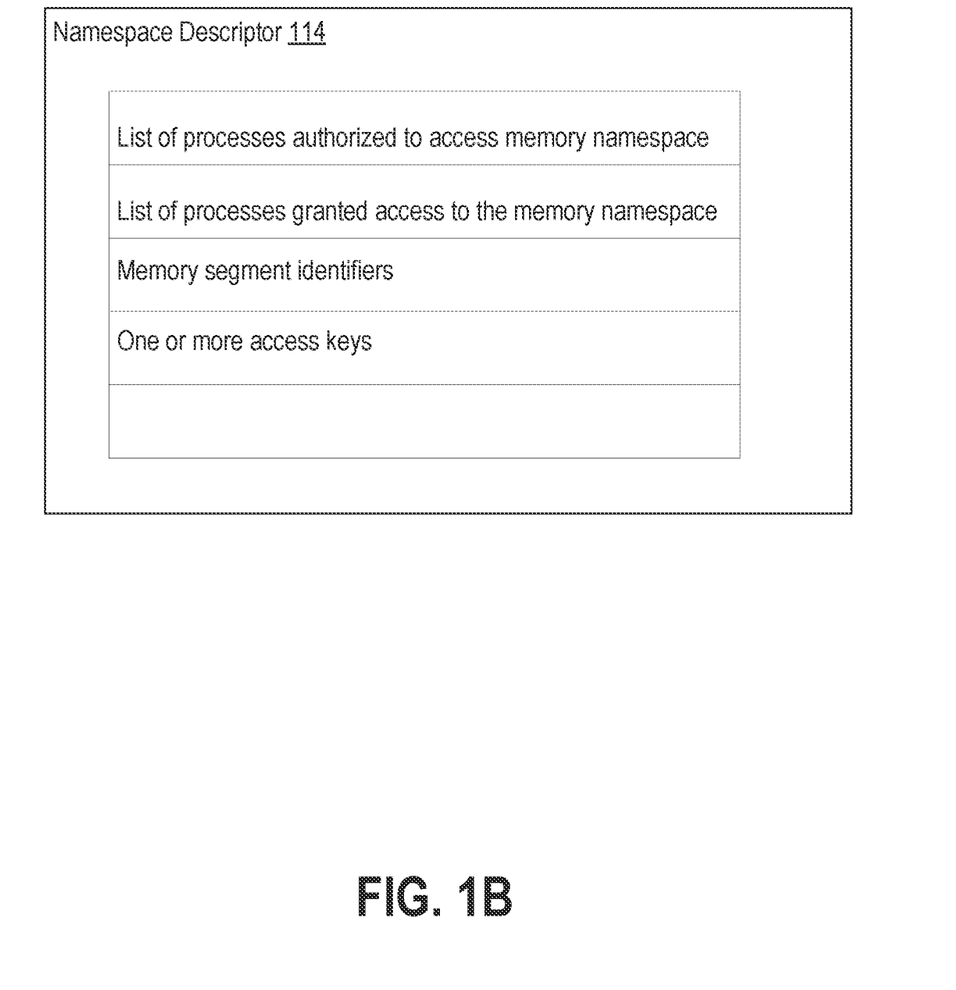
FIG. 1B is a block diagram that illustrates a namespace descriptor, in accordance with one or more embodiments.

FIG. 1B is a block diagram that illustrates a namespace descriptor, in accordance with one or more embodiments. The namespace descriptor 114 stores identities of process that are authorized to share the namespace. The namespace descriptor 114 also stores identities of process that have attached to the namespace. A process must attach to a namespace before accessing data in the namespace. The namespace descriptor also includes the list of memory segments allocated to the namespace. In an embodiment, access keys may be stored in the namespace descriptor. One type of access key is an encryption key. An encryption key may be stored for each memory segment and used to encrypt and decrypt data written to or read from the memory segment. In an alternate embodiment, a single encryption key may be used for encrypting and decrypting data written to or read from any of the memory segments allocated to the namespace. Similarly, protection key may be stored for each memory segment and used to control access to a memory segment. In an alternate embodiment, a single protection key may be used for controlling access to any of the memory segments allocated to the namespace.

Managed Global Areas 120 comprises memory segments allocated for privately shared namespaces from the SNM's application heap. In the example, Memory Segment 122, Memory Segment 124, and Memory Segment 126 are memory segments that have been allocated in the heap. A memory segment may comprise various types of memory entities such as SYS V segments, mapped files, and coherent memory segments (CMI), and system global area (SGA) segments In the illustrated example, memory segment 122 and memory segment 126 have been allocated to the shared namespace corresponding to Namespace descriptor 114. Memory segment 124 may be allocated to a different namespace, not illustrated as part of system 100.

In system 100 as illustrated, Process 140 and Process 150 are processes that share a namespace that is represented by Handle 112. Handle 112 references Namespace descriptor 114 that stores information about the namespace. Address Space 142 is process 140's virtual address space to which memory segment 122 is mapped. Similarly, Address Space 146 is process 140's virtual address space to which memory segment 126 is mapped, and Address Space 152 is process 150's virtual address space to which memory segment 122 is mapped.

In a database environment, processes comprise distinct threads of execution, each having private, non-shareable memory. A process may be a thread or OS process. A database server may comprise a mix of single-threaded OS processes and light-weight processes (threads). Some processes perform maintenance tasks such as performing instance recovery, cleaning up processes, writing redo buffers to disk, and so on. Other database processes perform work based on a client request, such as parsing SQL queries, creating and executing a query plan for each query, and reading buffers from the database buffer cache or from disk. Although the examples provided herein are directed to a group of database server processes cooperating to execute an SQL query on behalf of a particular client request, other database management processes may cooperate as well and take advantage of a shared namespace.

Unless specifically described otherwise, the word "process" is used herein to mean one particular thread of execution within a process having access to process virtual memory.

Handle 112 is an opaque data element that identifies a namespace descriptor. As referred to herein, a handle represents a namespace. A handle is a token which, when received by the SNM in a request, is used to locating the namespace descriptor of the corresponding namespace. In the example, process 150 receives handle 112 from process 140, and uses handle 112 to attach to the namespace. In an embodiment, upon attaching process 150 to the namespace, the SNM returns a new handle 113 that is private to process 150. Process 150 uses handle 113 for subsequent interactions with the SNM.

3. Creating and Sharing a Namespace

Figure 2:
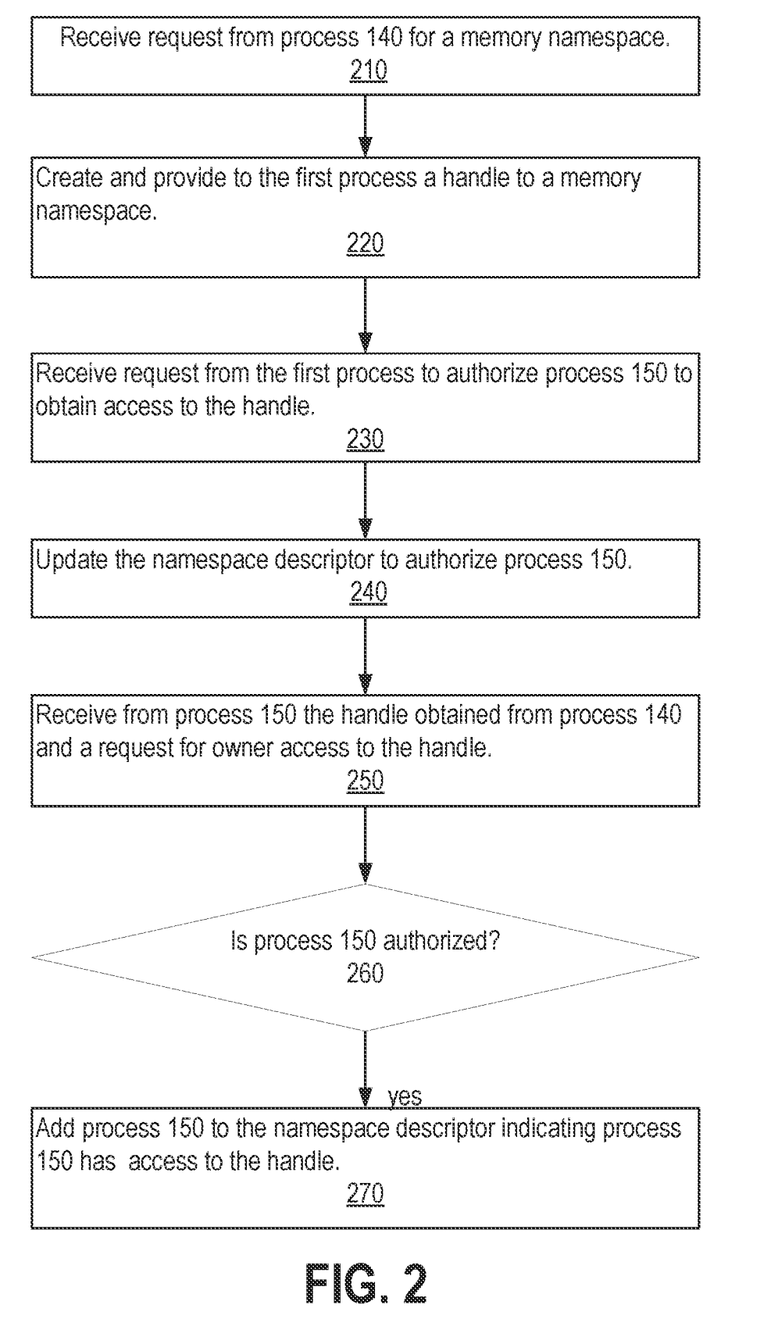
FIG. 2 is a flow diagram that illustrates creating and sharing a memory namespace, in accordance with one or more embodiments.

FIG. 2 is a flow diagram that illustrates creating and sharing a memory namespace, in accordance with one or more embodiments. In Operation 210, the SNM receives a request from a process, such as process 140, for a memory namespace that can be shared with another process, such as process 150. In general, sending/receiving request/response may be performed by any known means of inter-process communication including at least shared memory, pipes, sockets, and RPC. For example, process 140 may write request information into a shared memory area that the SNM reads, and the SNM may write a response into a shared memory area that process 140 reads.

At a minimum, the SNM creates a namespace descriptor 114, adds an identifier of the requesting process 140 to the list of processes authorized to access the namespace, creates a handle 112 to reference the namespace descriptor, and provides the handle to the requesting process (Operation 220). In an embodiment, the SNM may further perform other operations towards providing access to memory in the namespace, including one or more of: allocating a memory segment for the namespace and adding a descriptor for the allocated memory segment into the namespace descriptor, adding process 140 to the list of processes attached to the namespace, and mapping the allocated memory segment into the address space of process 140. In alternate embodiments, process 140 may receive a handle to an empty namespace and may issue one or more additional requests to cause the SNM to attach process 140 to the namespace, allocate memory segments for the namespace, add a descriptor for the allocated memory segments into the namespace descriptor, and map the memory segments into process 140's address space.

Process 140 may enable other processes, such as process 150, to share the namespace. Process 140 may send the handle to the SNM along with a request to authorize one or more other processes specified in the request, such as process 150, to share the name space (Operation 230). The SNM may add an identifier for each of the specified processes into the list of authorized processes in the namespace descriptor (Operation 240). In an embodiment, the list of processes to share the namespace may be provided with process 140's original request to create the namespace, and the list of authorized processes may be initialized with the provided list. Process 140 may further enable process 150 to share the namespace by providing the handle to process 150 through inter-process communication. For example, process 140 may send the handle to process 150 using a remote procedure call or other well-defined programmatic interface.

The SNM may receive a request from process 150 for owner access to the namespace (Operation 250). The request includes handle 112 that process 150 received from process 140.

In operation 260, the SNM searches the list of authorized processes for an identifier for process 150. If found, then process 150 is authorized to share the namespace, and if not found, process 150's request to attach to the namespace may be denied.

If process 150 is authorized to access the namespace, the SNM may add an identifier of process 150 to the list of processes having owner access to the namespace (Operation 270). In an embodiment, the SNM may further map memory segments already allocated to the shared namespace to process 150's address space. In an alternate embodiment, memory segments may be mapped into the address space only when process 150 attempts to access the memory.

In an embodiment, when a process accesses a memory address within the namespace, if the corresponding memory segment is not already mapped, the SNM maps the accessed segment into the process' address space. In an embodiment, the SNM may include an exception handler that receives a fault from the operating system. The fault handler triggers the SNM to map the missing segment.

4. Access Rights

One or more embodiments define a variety of access rights to a shared namespace. For example, fine grained access rights may include, for example: a) the right to read data from the shared namespace b) the right to write data into the shared namespace c) the right to authorize another process to share the namespace d) the right to rescind authorization to a process previously granted access e) the right to expand the size of the namespace (i.e., add memory segments) f) the right to remove memory or remove the namespace entirely, and g) no access. In an embodiment, an access right may be defined and enforced that combines more than one of these fine-grained access rights. For example, access to the name space may include both reading from and writing to the namespace. A right to manage access rights may include the right to grant and rescind authorization to process. In an embodiment, one or more access rights is defined and enforced: any process that is authorized to access the namespace (starting with the creator of the namespace) is granted all access rights. The term "owner access" as used herein refers to any definition of access rights. Accordingly, any process that may share the namespace has owner access regardless of which fine grained rights are granted to the process.

5. Use of Encryption and Protection Keys

A segment comprises one or more operating system pages, each page of can be associated with a protection key. When granting access for this segment to the current thread, the keys for all pages in the segment may be acquired by the SNM and loaded into the execution context of the current thread.

In an embodiment, the SNM may assign one or more access keys to each memory segment in a shared namespace. Access keys comprise protection keys and/or encryption keys. In an embodiment, the system may run on hardware that provides support for protection keys. When the SNM maps a memory segment into an address space, the SNM may provide the OS with the protection keys for that segment. Only processes having the correct protection keys will be successful in accessing the protected memory segment. In an embodiment, the SNM is implemented as a library that runs in the same execution context as the thread requesting access to the namespace. The SNM code may cause the protection key to be loaded into the execution context, where the hardware may compare the protection key in the execution context with the protection key protecting the memory segment.

In an embodiment, the access key may be an encryption key to encrypt data when writing to memory and decrypt data when reading for memory. In an embodiment in which the system runs on hardware that directly supports encryption and decryption of data, encryption key management may be performed the same as protection key management described above. In an embodiment in which the hardware does not provide such support, the process code obtains the encryption key from the SNM (the SNM may extract the key from the shared handle). The encryption key is then used by the process to encrypt data before writing to the memory and to decrypt data read from an encrypted memory segment. In an embodiment, a library invoked by the process may perform the encryption and decryption of the data.

The SNM only provides the appropriate encryption key to processes authorized to read and write the data, preventing unauthorized processes to interpret the data.

Threads running within a same process have access to all of the process memory. This may be problematic in a multi-tenant environment in which a process may concurrently process requests from different tenants. A potential security issue is addressed because the process memory may comprise multiple memory segments, each protected by a protection key. A thread may only access those memory segments within the process that belong to a namespace to which the thread has access; the thread must have the appropriate protection key in its execution context. Thus, not all threads running within a common process may have access to all of the process memory.

A protection key may be used whether or not the content stored in memory is encrypted. Thus, a protection key and an encryption key may be independent of one another. One or both of a protection key and an encryption key may be used.

6. Expanding a Namespace

Figure 3:
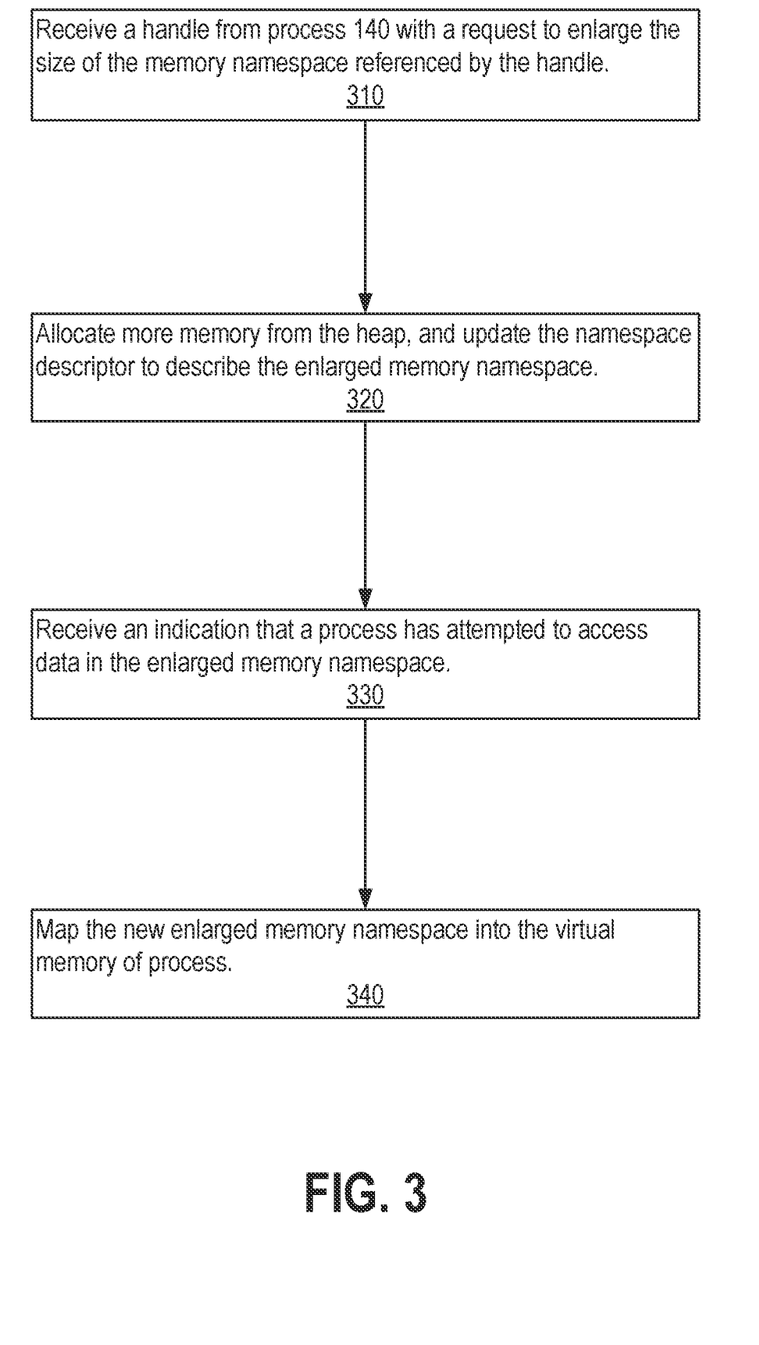
FIG. 3 is a flow diagram that illustrates allocating additional memory to a shared namespace, in accordance with one or more embodiments.

FIG. 3 is a flow diagram that illustrates allocating additional memory to a shared namespace, in accordance with one or more embodiments. In Operation 310, the SNM receives a request to increase the size of shared namespace. In an embodiment, any process with appropriate access rights to the namespace may make the request; the process that originally requested the shared namespace may not be required to request an expansion.

The SNM verifies that the handle provided by the requesting process provides the appropriate access rights and that granting the request would not exceed memory limits associated with the handle. If these criteria are met, the SNM may allocate one or more memory segments according to the requested size increase. The additional memory segments are added to the namespace by updating the namespace descriptor (Operation 320).

When the SNM receives an indication that a process has attempted to access data in the enlarged memory namespace (Operation 330), such as receiving a segmentation fault, the SNM may, after validating the permissions for the process and setting the required protection keys in its execution context, may map the added memory segments into the virtual address space of the process (Operation 340). Optionally, the SNM may proactively map the new memory segments into the address space of the requesting process or other sharing processes. If the handle does not have appropriate access rights or if adding the requested memory would exceed memory limits associated with the handle, the request may be denied.

7. Removing Access to a Namespace

Access rights to a namespace may be removed from a particular process by any process sharing the namespace that has appropriate access rights to rescind access (including the particular process itself). In addition to removing the process identifier of the process having access rescinded from the namespace descriptor, the SNM may replace previous access keys. Encryption keys with one or more new encryption keys which may be used to re-encrypt data already stored in the shared memory, and the new keys may be distributed to the remaining sharing processes. Similarly, memory segments may be protected by one or more new protection keys that are provided to the remaining sharing processes.

When a process dies (that is, ceases to exist), the SNM may remove the dead process' identifier from the namespace descriptor. When only one process has access to the namespace and that one process dies or is removed from the namespace, the namespace manager may remove the namespace and release the memory segments allocated to the namespace.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
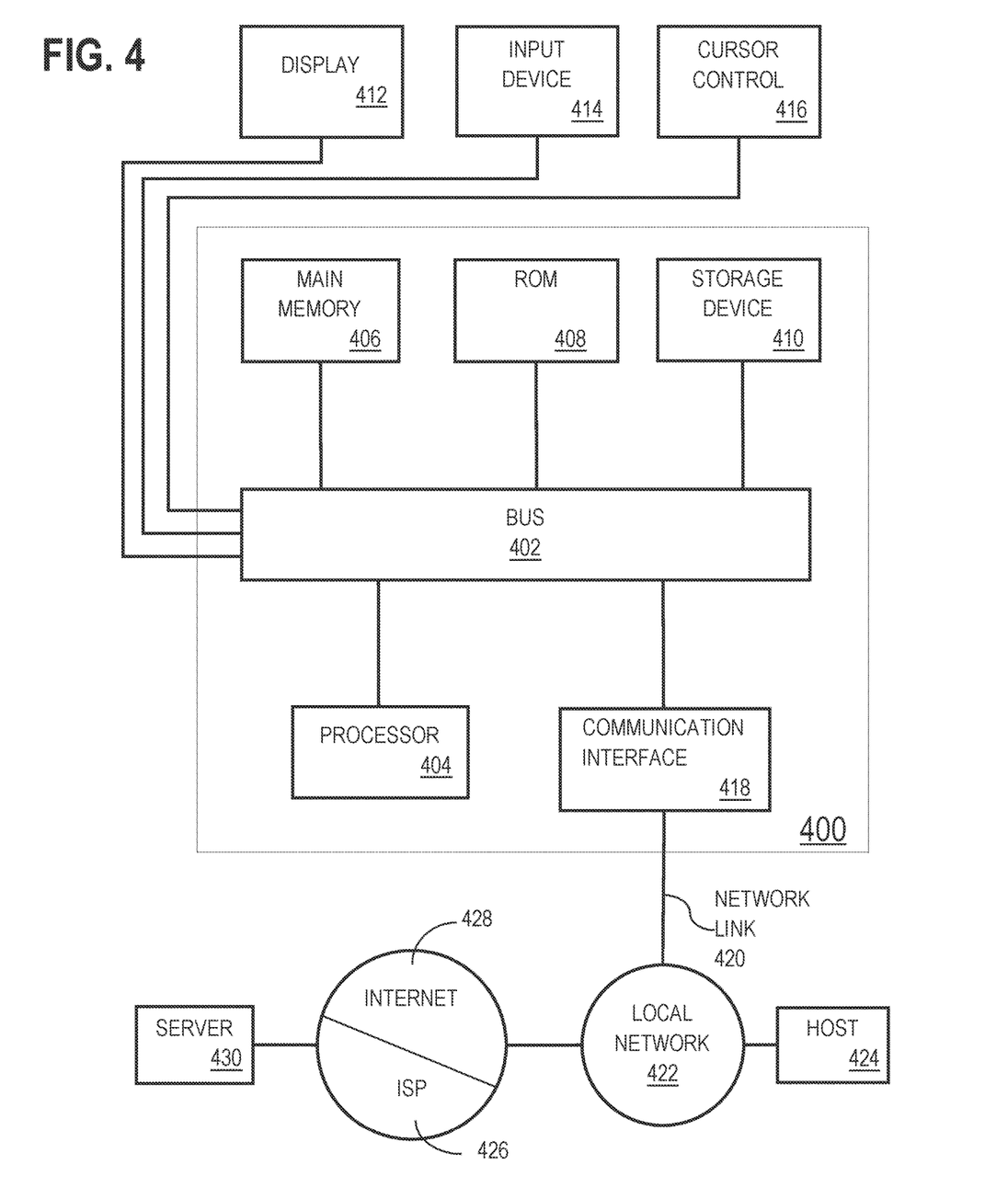
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
  receiving from a requesting process:
    (a) a handle that references a data structure, wherein the data structure identifies:
      (i) a shared memory namespace corresponding to the handle;
      (ii) a first process that has owner access to the handle;
      (iii) a second process that has owner access to the handle;
    (b) a first request to modify a size of the shared memory namespace corresponding to the handle,
  determining whether the requesting process has access rights to modify the size of the shared memory namespace corresponding to the handle;
  responsive at least to determining that the requesting process has access rights to modify the size of the shared memory namespace corresponding to the handle, granting the first request at least by:
    adding to, or removing from, the shared memory namespace at least one memory segment, in accordance with the first request to modify the size of the shared memory namespace, to generate an updated shared memory namespace;
    updating the data structure, referenced by the handle, to identify the updated shared memory namespace.

2. The medium of claim 1, wherein the first request to modify the size of the shared memory namespace comprises a request to add the at least one memory segment, and wherein granting the first request is further responsive to determining that adding the at least one memory segment would not exceed memory limits associated with the handle.

3. The medium of claim 1, wherein the requesting process is the same as the first process.

4. The medium of claim 1, wherein the operations further comprise:
  receiving an indication that a particular process attempted to access the updated shared memory namespace;
  responsive to verifying that the particular process is one of the processes having owner access to the handle:
    granting access to the updated shared memory namespace to the particular process.

5. The medium of claim 4, wherein granting access to the updated shared memory namespace comprises: mapping the updated shared memory namespace into a virtual memory of the particular process.

6. The medium of claim 4, wherein granting access to the updated shared memory namespace comprises: configuring an access key and providing the access key to the particular process to enable access to the updated shared memory namespace associated with the handle.

7. The medium of claim 6, wherein the access key is an encryption key used to encrypt data that the particular process stores in memory regions in the updated shared memory namespace or used to decrypt data that the particular process reads from the updated shared memory namespace.

8. The medium of claim 6, wherein the access key is a protection key that restricts access to the updated shared memory namespace to only processes having the protection key.

9. The medium of claim 4, wherein the requesting process is the same as the first process, and wherein the method further comprises:
  prior to receiving the handle and the first request to modify the size of the shared memory namespace:
    receiving a second request from the second process for the handle for the shared memory namespace to be shared with a set of one or more processes to be authorized to obtain owner access to the handle, the set of one or more processes including the particular process;
    responsive to receiving the second request from the second process for the handle to the shared memory namespace to be shared with the set of one or more processes:
      creating the handle and the data structure; and
      providing the handle to the second process.

10. A method comprising:
receiving from a requesting process:
- (a) a handle that references a data structure, wherein the data structure identifies:
  - (i) a shared memory namespace corresponding to the handle;
  - (ii) a first process that has owner access to the handle;
  - (iii) a second process that has owner access to the handle;
- (b) a first request to modify a size of the shared memory namespace corresponding to the handle, determining whether the requesting process has access rights to modify the size of the shared memory namespace corresponding to the handle;

responsive at least to determining that the requesting process has access rights to modify the size of the shared memory namespace corresponding to the handle, granting the first request at least by:
- adding to, or removing from, the shared memory namespace at least one memory segment, in accordance with the first request to modify the size of the shared memory namespace, to generate an updated shared memory namespace;
- updating the data structure, referenced by the handle, to identify the updated shared memory namespace.

11. The method of claim 10, wherein the first request to modify the size of the shared memory namespace comprises a request to add the at least one memory segment, and wherein granting the first request is further responsive to determining that adding the at least one memory segment would not exceed memory limits associated with the handle.

12. The method of claim 10, wherein the requesting process is the same as the first process.

13. The method of claim 10, further comprising:
receiving an indication that a particular process attempted to access the updated shared memory namespace;
responsive to verifying that the particular process is one of the processes having owner access to the handle:
granting access to the updated shared memory namespace to the particular process.

14. The method of claim 13, wherein granting access to the updated shared memory namespace comprises: mapping the updated shared memory namespace into a virtual memory of the particular process.

15. The method of claim 13, wherein granting access to the updated shared memory namespace comprises: configuring an access key and providing the access key to the particular process to enable access to the updated shared memory namespace associated with the handle.

16. The method of claim 15, wherein the access key is an encryption key used to encrypt data that the particular process stores in memory regions in the updated shared memory namespace or used to decrypt data that the particular process reads from the updated shared memory namespace.

17. The method of claim 15, wherein the access key is a protection key that restricts access to the updated shared memory namespace to only processes having the protection key.

18. The method of claim 13, wherein the requesting process is the same as the first process, and wherein the method further comprises:
prior to receiving the handle and the first request to modify the size of the shared memory namespace:
receiving a second request from the second process for the handle for the shared memory namespace to be shared with a set of one or more processes to be authorized to obtain owner access to the handle, the set of one or more processes including the particular process;
responsive to receiving the second request from the second process for the handle to the shared memory namespace to be shared with the set of one or more processes:
creating the handle and the data structure; and
providing the handle to the second process.

19. A system, comprising:
one or more processors; and
memory storing instructions that, when executed by the one or more processors, cause the system to perform:
receiving from a requesting process:
- (a) a handle that references a data structure, wherein the data structure identifies:
  - (i) a shared memory namespace corresponding to the handle;
  - (ii) a first process that has owner access to the handle;
  - (iii) a second process that has owner access to the handle;
- (b) a first request to modify a size of the shared memory namespace corresponding to the handle, determining whether the requesting process has access rights to modify the size of the shared memory namespace corresponding to the handle;

responsive at least to determining that the requesting process has access rights to modify the size of the shared memory namespace corresponding to the handle, granting the first request at least by:
adding to, or removing from, the shared memory namespace at least one memory segment, in accordance with the first request to modify the size of the shared memory namespace, to generate an updated shared memory namespace;
updating the data structure, referenced by the handle, to identify the updated shared memory namespace.

20. The system of claim 19, wherein the first request to modify the size of the shared memory namespace comprises a request to add the at least one memory segment, and wherein granting the first request is further responsive to determining that adding the at least one memory segment would not exceed memory limits associated with the handle.

* * * * *

UNITED STATES PATENT AND TRADEMARK OFFICE
CERTIFICATE OF CORRECTION

| | | |
|---|---|---|
| PATENT NO. | : 11,741,022 B2 | Page 1 of 1 |
| APPLICATION NO. | : 17/204708 | |
| DATED | : August 29, 2023 | |
| INVENTOR(S) | : Muthukrishnan et al. | |

It is certified that error appears in the above-identified patent and that said Letters Patent is hereby corrected as shown below:

In the Specification

In Column 3, Line 8, delete "Specification" and insert -- specification --, therefor.

In Column 4, Line 36, delete "segments" and insert -- segments. --, therefor.

In the Claims

In Column 14, Line 52, in Claim 9, delete "method" and insert -- operations --, therefor.

In Column 14, Line 53, in Claim 9, delete "comprises:" and insert -- comprise: --, therefor.

Signed and Sealed this
Fifth Day of November, 2024

Katherine Kelly Vidal
*Director of the United States Patent and Trademark Office*